US008500517B2

(12) United States Patent
Harada et al.

(10) Patent No.: US 8,500,517 B2
(45) Date of Patent: Aug. 6, 2013

(54) PREPARATION OF SYNTHETIC QUARTZ GLASS SUBSTRATES

(75) Inventors: Daijitsu Harada, Joetsu (JP); Masaki Takeuchi, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 423 days.

(21) Appl. No.: 12/966,428

(22) Filed: Dec. 13, 2010

(65) Prior Publication Data

US 2011/0159785 A1    Jun. 30, 2011

(30) Foreign Application Priority Data

Dec. 28, 2009   (JP) ................................ 2009-297214

(51) Int. Cl.
*B24B 1/00* (2006.01)
(52) U.S. Cl.
USPC ............... 451/37; 451/36; 451/57; 451/41; 216/52; 216/88; 216/97
(58) Field of Classification Search
CPC .................. B44C 1/22; B44C 1/227
USPC ............. 451/36–37, 41, 57; 252/79.1–79.5; 216/52–53, 88–89, 83, 97–98; 134/2–3
See application file for complete search history.

(56) References Cited

U.S. PATENT DOCUMENTS

| | | | | |
|---|---|---|---|---|
| 5,273,620 A | * | 12/1993 | Lamberti | 216/30 |
| 6,149,696 A | * | 11/2000 | Jia | 51/308 |
| 6,263,704 B1 | * | 7/2001 | Tomita et al. | 65/30.13 |
| 6,626,967 B2 | * | 9/2003 | Takami et al. | 51/308 |
| 6,719,819 B2 | * | 4/2004 | Ota et al. | 51/308 |
| 6,790,129 B2 | * | 9/2004 | Moriya et al. | 430/5 |
| 7,070,703 B2 | * | 7/2006 | Benning et al. | 216/89 |
| 7,413,832 B2 | * | 8/2008 | Koike et al. | 430/5 |
| 7,497,095 B2 | * | 3/2009 | Sato | 65/310 |
| 7,691,279 B2 | * | 4/2010 | Koike | 216/84 |
| 7,732,101 B2 | | 6/2010 | Koike et al. | |
| 8,084,363 B2 | * | 12/2011 | Amanokura et al. | 438/692 |
| 2002/0078710 A1 | * | 6/2002 | Takeuchi et al. | 65/31 |
| 2004/0050710 A1 | * | 3/2004 | Yan | 205/221 |
| 2004/0192063 A1 | * | 9/2004 | Koike | 438/736 |
| 2005/0186691 A1 | * | 8/2005 | Koike et al. | 438/14 |
| 2006/0205219 A1 | * | 9/2006 | Baker et al. | 438/692 |
| 2006/0223224 A1 | * | 10/2006 | Akagawa | 438/106 |
| 2007/0132068 A1 | * | 6/2007 | Shibano et al. | 257/644 |
| 2008/0003829 A1 | * | 1/2008 | Shin et al. | 438/692 |
| 2008/0017610 A1 | * | 1/2008 | Mannami et al. | 216/52 |
| 2008/0092918 A1 | * | 4/2008 | Ikuta | 134/1 |
| 2009/0011681 A1 | * | 1/2009 | Koike et al. | 451/36 |
| 2009/0094901 A1 | * | 4/2009 | Shinoda et al. | 51/306 |
| 2009/0176372 A1 | * | 7/2009 | Minamihaba et al. | 438/693 |
| 2009/0209104 A1 | * | 8/2009 | Kimura | 438/693 |
| 2010/0243950 A1 | * | 9/2010 | Harada et al. | 252/79.5 |
| 2010/0255761 A1 | * | 10/2010 | Shibano et al. | 451/41 |
| 2011/0318995 A1 | * | 12/2011 | Okafuji et al. | 451/41 |

FOREIGN PATENT DOCUMENTS

| | | |
|---|---|---|
| EP | 1 043 379 A1 | 10/2000 |
| EP | 2 090 400 A1 | 8/2009 |
| JP | 64-040267 A | 2/1989 |
| JP | 2001-205553 A | 7/2001 |
| JP | 2002-074653 A | 3/2002 |
| JP | 2002-131889 A | 5/2002 |
| JP | 2003-266283 A | 9/2003 |
| JP | 2004-098278 A | 4/2004 |
| JP | 2004-253696 A | 9/2004 |
| JP | 2007-284341 A | 11/2007 |
| JP | 2009-027133 A | 2/2009 |
| JP | 4283061 B2 | 6/2009 |
| JP | 2009-206300 A | 9/2009 |
| WO | 2009/150938 A1 | 12/2009 |

OTHER PUBLICATIONS

Japanese Office Action dated Feb. 15, 2012, issued in corresponding Japanese Patent Application No. 2009-297214.
European Search Report dated May 30, 2011, issued in corresponding European Patent Application No. 10252135.8.

* cited by examiner

*Primary Examiner* — George Nguyen
(74) *Attorney, Agent, or Firm* — Westerman, Hattori, Daniels & Adrian, LLP

(57) ABSTRACT

A synthetic quartz glass substrate is prepared by (1) polishing a synthetic quartz glass substrate with a polishing slurry comprising colloidal particles, an ionic organic compound having an electric charge of the same type as the colloidal particles, and water, and (2) immersing the polished substrate in an acidic or basic solution for etching the substrate surface to a depth of 0.001-1 nm. The method produces a synthetic quartz glass substrate while preventing formation of defects of a size that is detectable by the high-sensitivity defect inspection tool, and providing the substrate with a satisfactory surface roughness.

8 Claims, No Drawings

US 8,500,517 B2

PREPARATION OF SYNTHETIC QUARTZ GLASS SUBSTRATES

CROSS-REFERENCE TO RELATED APPLICATION

This non-provisional application claims priority under 35 U.S.C. §119(a) on Patent Application No. 2009-297214 filed in Japan on Dec. 28, 2009, the entire contents of which are hereby incorporated by reference.

TECHNICAL FIELD

This invention relates to a method for preparing synthetic quartz glass substrates for main use in semiconductor-related electronic materials, especially synthetic quartz glass substrates for use in advanced electronic materials and nanoimprint-related materials.

BACKGROUND ART

Quality factors of synthetic quartz glass substrates include the size and density of defects on substrates, flatness, surface roughness, photochemical stability of material, and surface chemical stability. Of these, the quality relating to defects on substrates encounters increasingly rigorous requirements in accordance with the trend of IC technology toward finer feature size processing.

As advances are made on the manufacture of synthetic quartz glass substrates, their surface roughness and defect quality have been improved every year. The traditional process generally includes a polishing step using a cerium oxide base slurry. JP-A S64-40267 proposes the steps of polishing a glass substrate with a cerium oxide base slurry and then precision polishing it with colloidal silica for thereby reducing surface roughness. Currently the precision polishing using colloidal silica becomes the mainstream.

The polishing step is generally followed by a cleaning step. The cleaning step for removing the abrasives and contaminants from the glass substrate surface is divided into several modes, a first mode of showering the glass substrate, a second mode of scrubbing the glass substrate using sponge or the like, and a third mode of immersing the glass substrate in an alkaline or acidic chemical liquid. Further a combination of these modes is widely employed. It is also commonly employed to apply ultrasonic wave during the cleaning step for enhancing the cleaning efficiency.

Recently, polishing and cleaning methods capable of making the glass substrate surface cleaner were proposed. For example, recognizing that once a surfactant is leached out of a polishing pad during polishing, it helps colloidal silica adhere to the substrate, JP 4283061 proposes that polishing is effected with the polishing pad from which the surfactant has been removed. JP-A 2002-131889 proposes cleaning with hydrofluoric acid having an ability to remove colloidal silica. JP-A 2007-284341 proposes cleaning a glass substrate with a cleaning fluid having an etching action on the glass substrate and a higher etching action on metal impurities in a polishing slurry.

JP-A 2004-098278 describes to eliminate raised microscopic defects by polishing with high purity colloidal silica near a neutral level. Such colloidal silica in the neutral range, even in the case of high purity products having a fully low concentration of impurities such as metals, is substantially impossible to continue a steady service because it tends to gel, thicken, or undergo a variation in the particle size distribution of abrasive grains after iteration of polishing steps. Although it might be possible to use colloidal silica in a one-way flow-away manner such that once contacted with the glass substrate, the slurry is discarded, this is undesired from the aspects of economy and environment because expensive high-purity colloidal silica must be used in a large amount.

CITATION LIST

Patent Document 1: JP-A S64-40267
Patent Document 2: JP 4283061
Patent Document 3: JP-A 2002-131889
Patent Document 4: JP-A 2007-284341
Patent Document 5: JP-A 2004-098278

SUMMARY OF INVENTION

Under the circumstances, a high sensitivity defect inspection tool has recently been developed. Using such a tool, the inventors continued research works for controlling surface microscopic defects. It was found that on the surface of a colloidal silica-polished glass substrate after cleaning by a conventional cleaning technique, there were present defects of various types, which were undetectable with the prior art inspection technology, including recessed defects having a depth of several nanometers to about 100 nm and a major axis diameter of several tens of nanometers to about 500 nm, thin streaks having a depth of 1 to 5 nm and a length of 1 μm to several tens of microns, and raised defects having a height of several nanometers to several tens of nanometers and a major diameter of several tens of nanometers to about 500 nm. If a mask blank is prepared using a substrate having such defects on its surface, there is a tendency that defects are enlarged after forming a film on the substrate, so that they become "killer" defects having a significant impact on an image to be transferred from the mask to a silicon wafer.

One acknowledgement based on these findings is that even when the recently proposed polishing and cleaning methods as disclosed in JP 4283061, JP-A 2002-131889, and JP-A 2007-284341 are used, it is difficult to reduce all defects of various types while maintaining a satisfactory surface roughness.

The inventors' research revealed the following. Hydrofluoric acid commonly used in dilute hydrofluoric acid form has a concentration of 0.3 to 0.5% by weight. When a synthetic quartz glass substrate is treated on its surface with hydrofluoric acid of such concentration, simple immersion at a concentration of 0.5% by weight for 20 seconds, for example, results in an etching amount of about 1 nm. Treatment of such strength can cause very minute flaws to become manifest. Specifically, very minute defects having a depth of less than several nanometers and a size of less than 50 nm which do not originally become killer defects can be enlarged if a region surrounding that defect has been so stressed as to allow for access of hydrofluoric acid, that is, they can become defects of a sufficient size to affect the transfer image. The surface roughness is also exacerbated with a concomitant change of about 0.01 nm on the level of the advanced photomask application where a surface roughness of less than or equal to 0.15 nm calculated as RMS is required.

A cleaning liquid having a strong etching power has a similar effect. This cleaning method has a strong power to remove raised defects resulting from the colloidal silica abrasive, but causes to produce minute recessed defects or exacerbate the surface roughness. Since some substrates are subjected to repetitive cleaning steps including intermediate cleaning between various inspection items and re-cleaning of substrates after long-term storage, they are further deteriorated in quality. In JP 4283061, the polishing method is so devised as to reduce adhesion of raised defects. Examples, however, simply refer to cleaning with dilute hydrofluoric acid, indicating that the quality of glass substrates can be exacerbated, depending on a concentration and immersion time. The method is not regarded as satisfactory in producing glass substrates of high surface quality.

An object of the invention is to provide a method for preparing a synthetic quartz glass substrate, capable of effectively removing raised defects without exacerbating the surface roughness or increasing recessed defects, thus contributing to an improvement in the yield associated with the manufacture of semiconductor devices or the like.

Considering the polishing and cleaning steps as an integral process, the inventors have found that the outstanding problem can be overcome by combining the step of polishing using readily cleanable abrasive grains with the step of cleaning to a degree sufficient to remove abrasive grains, but insufficient to cause surface roughening. For the purpose of preventing formation of raised defects, the inventors have found that by adding to a polishing slurry containing colloidal particles used in the polishing step, an ionic organic compound electrically charged to the same type as the colloidal particles, the cleaning effect of the subsequent cleaning step is improved. The ionic organic compound electrically charged to the same type as the colloidal particles surrounds abrasive grains and impurities in the polishing slurry, and raised defect precursors such as swarf in a comprehensive manner due to the electric effect and/or bulky effect (associated with steric hindrance), thereby restraining the raised defect precursors from fusing and adhering to the surface of the polished glass substrate. The ionic compound is a substance which readily dissolves in the chemical solution used in the subsequent cleaning step, even when the ionic compound is adhered to the substrate surface as being integrated with the raised defect precursor, the ionic compound integrated with the raised defect is readily removed during the cleaning step due to the ease of dissolution of the ionic compound. These effects are more exerted particularly when the ionic organic compound has an increased charge or is a water-soluble polymer. The present invention is predicated on these findings.

The invention provides a method for preparing a synthetic quartz glass substrate, comprising the steps of:

(1) polishing a synthetic quartz glass substrate with a polishing slurry comprising colloidal particles, an ionic organic compound having an electric charge of the same type as the colloidal particles, and water, and (2) immersing the polished substrate in an acidic or basic solution for etching the substrate surface to a depth of 0.001 to 1 nm.

In a preferred embodiment, the polishing slurry is a dispersion comprising colloidal silica in a concentration of 20 to 50% by weight. In a preferred embodiment, the ionic organic compound is a water-soluble polymer, and more specifically polyacrylic acid, polymaleic acid, or polyphthalic acid. In a preferred embodiment, the acidic or basic solution is an aqueous solution comprising an inorganic base of an alkali or alkaline earth metal.

The immersing step (2) is often performed within 48 hours from the end of the polishing step (1). The immersing step (2) may include ultrasonication.

The method may further comprise the step of cleaning the substrate resulting from the immersing step (2).

ADVANTAGEOUS EFFECTS OF INVENTION

The method is advantageous in the manufacture of synthetic quartz glass substrates for use as photomask substrates in the photolithography important in the manufacture of IC or the like and synthetic quartz glass substrates for use in the nano-imprint application. The method for producing a synthetic quartz glass substrate prevents formation of defects of a size that is detectable by the high-sensitivity defect inspection tool, and provides the substrate with a satisfactory surface roughness. Thus an improvement in the yield of the manufacture process of semiconductor devices or the like is expectable as well as a further miniaturization in the semiconductor industry.

DESCRIPTION OF EMBODIMENTS

The method for preparing or finishing a synthetic quartz glass substrate according to the invention involves the steps of (1) polishing a synthetic quartz glass substrate with a polishing slurry comprising colloidal particles, an ionic organic compound having an electric charge of the same type as the colloidal particles, and water, and (2) immersing the polished substrate in an acidic or basic solution to etch the substrate surface to a depth of 0.001 to 1 nm.

The colloidal particles in the polishing slurry preferably have a fine particle size, and specifically a primary particle size of preferably 5 to 500 nm, more preferably 10 to 200 nm, and most preferably 20 to 150 nm. Colloidal particles with too small a particle size have an increased specific surface area to prevent a dispersant from exerting its dispersing effect and tend to attach or adhere to the substrate surface, interfering with the subsequent cleaning. Particles with too large a particle size may provide a substrate as polished with a poor surface roughness and be undesirable as the abrasive for final precision polishing. It is noted that the particle size is a measurement by the dynamic light scattering method.

The polishing slurry contains colloidal particles in a concentration of 20 to 50% by weight, and preferably 40 to 50% by weight. With a concentration of less than 20% by weight, microscopic flaws may be formed on the glass surface. A polishing slurry with a concentration of more than 50% by weight may become unstable and increase its viscosity to inhibit polishing.

For the colloidal particles, the particle size distribution may be either monodisperse or polydisperse, or multimodal. Types of colloidal particles include colloidal silica, colloidal ceria, and colloidal zirconia, with colloidal silica being most preferred. With respect to the particle shape, colloidal silicas dispersed in various colloidal forms including spherical, cocoon, and coupled forms are available, with the colloidal silica in spherical form being preferred.

Colloidal silicas include those from various preparation methods, for example, those granulated from water glass, and those obtained from hydrolysis of organic silicate compounds such as alkoxysilanes. Many dispersing media generally have alkaline pH from the standpoint of storage stability although neutral or acidic pH may be acceptable. Preferred are pH values in the range of 3 to 5 or in the range of 8 to 11. More preferred are pH values in the range of 9 to 10.5. Colloidal silica at a pH level in the range typically possesses a negative charge as long as it is prepared by standard methods such as water glass, alkoxide and emulsion methods, has not been chemically modified on surface, and is surface covered with hydroxyl groups. At near neutrality pH, the colloid lacks electrostatic stability and the polishing slurry may tend to be unstable. At too strong alkalinity, surface roughening may occur on the polished glass. It is understood that colloidal silica may be positively charged when surface hydroxyl groups are chemically modified with organic compound or metal ions.

On use as abrasive grains, silica is generally dispersed in water. Silica may also be dispersed in an organic solvent such as methanol, isopropanol, ethylene glycol, methyl ethyl ketone, toluene, or xylene or a mixture thereof. Moreover, of these organic solvents and mixtures thereof, water-soluble ones may be mixed with water in any desired proportion.

As the colloidal silica dispersion liquid, commercially available products may be used, for example, COMPOL-50, COMPOL-80, COMPOL-120 and COMPOL-EX111 from Fujimi Inc., ST-XL, ST-YL, and ST-ZL from Nissan Chemical Industries, Ltd., SYTON from Dupont, NALCO series from Nitta Haas Inc., and GP series from Fuso Chemical Co., Ltd.

When the dispersion or polishing slurry is used to polish glass substrates, an additive capable of improving the cleaning effect of the subsequent cleaning step, specifically an ionic organic compound having an electric charge of the same type as the colloidal particles is added to the polishing slurry. This additive serves to inhibit formation of defects of various types during the subsequent cleaning step and thus contributes to the manufacture of a glass substrate having a satisfactory surface roughness.

The inventors made investigations on the mechanism of forming defects of various types, based on the following hypothesis. Raised defects having a major diameter of several tens of nanometers to about 500 nm and a height of several nanometers to several tens of nanometers are not removable during the cleaning step for the following reason. Abrasive grains in the polishing slurry undergo condensation between their surfaces due to the work by polishing action, or condensation with glass swarf removed from the surface being polished, to create active particles which can cause defects. These active particles then condense or attach to the surface under the polishing action. Due to a shortage of the capability of the subsequent cleaning step, such defects cannot be fully removed, and some may be left on the product surface.

Recessed defects having a depth of several nanometers to about 100 nm and a major diameter of several tens of nanometers to about 500 nm, and thin streaks having a depth of 1 to 5 nm and a length of 1 μm to several tens of microns form from complex causes. One cause is that abrasive grains in the polishing slurry undergo condensation between their surfaces due to the work by polishing action, or condensation with glass swarf removed from the surface being polished, to create active particles which can cause defects. These active particles then create flaws on the surface under the polishing action. Even when flaws created in this way originally have a very minute size of insignificance, they are enlarged if the cleaning fluid used in the subsequent cleaning step has a strong etching power. Such enlarged flaws become killer defects having a strong impact on the image focusing after transfer. If cleaning is performed with a sponge or brush which may be used for the purpose of increasing the force of removing the adhered raised defects resulting from the abrasive grains as discussed above, then the contact of the sponge or brush causes flaws. Further, raised defects once removed are left on the sponge as foreign particles, whereupon the glass surface may be rubbed with these foreign particles. This also causes to create flaws. These flaws are observed as thin streaks having a length of 1 μm to several tens of microns which are considered problematic in the advanced photomask application.

Under the circumstances, the inventors considered the polishing and cleaning steps as an integral process and acknowledged that it is important to finish a synthetic quartz glass substrate by combining the step of polishing using readily cleanable abrasive grains with the step of cleaning to a degree sufficient to remove abrasive grains, but insufficient to cause surface roughening.

The inventors presumed that if an ionic organic compound having an electric charge of the same type as colloidal particles is added to a colloidal particle-containing polishing slurry used in the polishing step, then the cleaning capability of the subsequent cleaning step can be enhanced.

In case that colloidal particles have a negative charge, examples of the ionic organic compound having a charge of the same type as the colloidal particles include water-soluble polymers, for example, homopolymers such as polyacrylic acid, polymaleic acid, polyphthalic acid, and alkali metal (e.g., sodium) salts thereof, copolymers of monomers such as acrylic acid, maleic acid, and phthalic acid in any desired proportion, cellulose derivatives, and polyvinyl alcohol. Also included are amino acids such as aspartic acid, glutamic acid, asparagine, serine, and threonine; phenols such as phenol, cresol, xylenol, naphthol, catechol, resorcinol, hydroquinone, pyrogallol, and chloroglucinol; and hyaluronic acid, heparan sulfate, chondroitin sulfate, keratan sulfate, and salts thereof. In case that colloidal particles have a positive charge, examples of the ionic organic compound having a charge of the same type as the colloidal particles include water-soluble polymers such as polyvinyl pyrrolidone, polyacrylamide, polyethyleneimine, polyvinylamine, polyallylamine, polyornithine, and polylysine. Also included are amino acids such as lysine and arginine, and guanidine.

Inter alia, water-soluble polymers such as polyacrylic acid, polymaleic acid, polyphthalic acid, and alkali metal salts thereof are preferred. The water-soluble polymer is preferably contained in a concentration of 0.001 to 1% by weight, more preferably 0.01 to 0.5% by weight based on the weight of solids, typically silica, in the colloidal solution. Outside the range, a lower concentration of the polymer may be ineffective for controlling flaws whereas a higher concentration of the polymer may interfere with a stable supply of the polishing slurry to the polishing tool due to the viscosity of the water-soluble polymer. The water-soluble polymer preferably has a weight average molecular weight (Mw) of 1,000 to 100,000,000, and more preferably 10,000 to 10,000,000. Outside the range, a polymer having a lower Mw may be ineffective for controlling flaws whereas a polymer having a higher Mw and hence a high viscosity may interfere with a stable supply of the polishing slurry to the polishing tool. It is noted that the Mw is a measurement by gel permeation chromatography (GPC) versus polystyrene standards.

If necessary, additives such as pH modifiers, buffer agents and rust preventives may be added to the polishing slurry. In particular, pH adjustment of the polishing slurry is important in controlling microscopic defects. It is thus desirable to add a pH modifier in order to keep the slurry in the range of pH 9 to pH 10.5.

Suitable pH modifiers which can be used herein include alkali metal hydroxides, alkaline earth metal hydroxides, basic salts, amines, and ammonia. Examples include potassium hydroxide, sodium hydroxide, calcium hydroxide, sodium borate, monoethanolamine, diethanolamine, triethanolamine, and ethylenediamine. The additives exemplified above may be used alone or in combination of two or more. Inter alia, diethanolamine and triethanolamine are preferred.

The pH modifier is preferably added in such an amount as to provide pH in the range of 9 to 10.5. Since it is important that the pH of the polishing slurry does not deviate from this range during polishing, the sequence of adding other additives in advance and adding the pH modifier later is preferred. If the pH of the polishing slurry varies during polishing, the pH modifier may be added at an appropriate point of time so as to provide pH 9 to pH 10.5. In the case of strong bases having a high dissociation constant like alkali metal hydroxides, pH adjustment is difficult because in the relevant pH range, even a small difference in addition amount may result in a substantial variation of pH. In this regard, diethanolamine and triethanolamine which are bases of moderate strength are the preferred pH modifiers. At near neutrality pH, colloidal silica tends to be unstable which is inconvenient to continuous polishing. At too high pH, surface roughening may occur on the polished quartz glass.

Additives other than the pH modifier which can be used herein include carboxylic acids and salts thereof. Specifically, carboxylic acids of chain structure having a molecular weight of at least 100 and aromatic carboxylic acids are preferred. Examples include methacrylic acid, succinic acid, maleic acid, fumaric acid, tartaric acid, malic acid, adipic acid, citric acid, benzoic acid, methylbenzoic acid, t-butylbenzoic acid, salicylic acid, phthalic acid, isophthalic acid, terephthalic acid, phenylacetic acid, and salts thereof. The additives exemplified above may be used alone or in combination of two or more. Since these molecules are water soluble and bulky, they have the advantage that when added to the polishing slurry, they coordinate with colloidal particles to stabilize the colloidal state.

It is noted that the polishing mode using the polishing slurry prepared as above is typically batchwise double-side polishing although single-side polishing and single-substrate polishing may also be acceptable.

Following the polishing step, the synthetic quartz glass substrate is cleaned in the cleaning step. For cleaning, the synthetic quartz glass substrate is immersed in an acidic or basic solution until the glass substrate surface is etched to a depth of 0.001 to 1 nm, preferably 0.01 to 0.1 nm. An etching depth of less than 0.001 nm indicates a short cleaning power, and raised defects and contaminants resulting from the polishing slurry remain on the substrate surface. If the etching depth is more than 1 nm, raised defects and contaminants resulting from the polishing slurry are eliminated, but recessed defects which are originally very minute become manifest and the surface roughness is worsened.

The cleaning step of immersing the glass substrate in an acidic or basic solution to etch the glass substrate surface to a depth of 0.001 to 1 nm is desirably performed within 48 hours, more desirably within 12 hours, and even more desirably within 3 hours from the end of the polishing step. By commencing cleaning shortly after the polishing step, a better cleaning effect is obtainable because of little time for contaminants to be fixed. It should be avoided that the glass substrate as polished is held in a dry state for the duration from the end of polishing to the start of cleaning, because contaminants are otherwise fixed tenaciously. Even if the glass substrate as polished is kept immersed in clean ultrapure water at neutral pH for storage, abrasive grains, specifically colloidal silica, used in the colloidal solution and remaining on the glass substrate surface have a reduced zeta potential, and the cleaning-promoting substance present in proximity to abrasive grains will diffuse into the pure water with the lapse of time, and as a result, abrasive grains are tenaciously fixed to the glass substrate surface. Even if the glass substrate is later immersed in a cleaning liquid having a strong etching power, the fixed abrasive grains may be retained as raised defects.

Since synthetic quartz glass has high chemical resistance, only a few chemical solutions are available as the acidic or basic solution used herein. Examples include aqueous solutions of hydrofluoric acid and hydrofluoric acid salts, and aqueous solutions of inorganic bases such as alkali metal hydroxides and alkaline earth metal hydroxides. Inter alia, alkali metal hydroxides and alkaline earth metal hydroxides are preferred. Since the colloid solution as the polishing slurry, especially basic colloidal silica has a pH value of about 10, it is preferred to immerse the glass substrate in a solution adjusted to pH of from more than 10.5 to 14 with a strongly basic alkali metal hydroxide or alkaline earth metal hydroxide. When the glass substrate is immersed in a cleaning solution at a higher pH level than the polishing slurry, not only contaminants resulting from the polishing slurry and adhered to the substrate surface in conjunction with the ionic organic compound having a charge of the same type as the colloidal particles in the polishing slurry become more dissolvable at a higher pH level, but also the effect of dissolving abrasive grains adhered to the surface themselves is expectable. More preferably, the glass substrate is immersed in a solution adjusted to pH 11 to 13. Within this pH range, it is easy to control an etching depth in the range of 0.001 to 1 nm. At too low pH, productivity may be exacerbated because a longer time is taken until an etching depth of 0.001 nm is reached, and no satisfactory cleaning effect may be exerted due to a short cleaning power. Too high pH may cause surface roughening. Since hydrofluoric acid and hydrofluoric acid salts have a strong etching power relative to quartz glass, even a dilute hydrofluoric acid solution having a low hydrofluoric acid concentration may be difficult in some cases to control an etching depth consistently in the range of 0.001 to 1 nm.

The cleaning mode employed in the cleaning step with an acidic or basic solution may be either single-substrate cleaning or batchwise cleaning.

The cleaning step of immersing the glass substrate in an acidic or basic solution to etch the glass substrate surface to a depth of 0.001 to 1 nm may be combined with an auxiliary cleaning step, for example, cleaning with sponge or brush, simple immersion in a chemical liquid having no or little etching ability to quartz glass, such as pure water, ozone water, ammonia/hydrogen peroxide water, sulfuric acid/hydrogen peroxide water, conc. sulfuric acid, or hydrogenated water, or immersion in the foregoing chemical liquid under ultrasonication. It is preferred that the cleaning step of immersing the glass substrate in an acidic or basic solution to etch the glass substrate surface to a depth of 0.001 to 1 nm precede the auxiliary cleaning step. Although the sponge or brush has a force to remove raised defects, there is a problem that raised defects once removed are attached to the sponge or brush, indicating a possibility that when the substrate surface is rubbed with such sponge or brush, recessed defects may be formed in the substrate surface. Thus, if the glass substrate surface just as polished, which is believed to have many raised defects adhered thereto, is cleaned with sponge or brush, undesirably numerous recessed defects can be formed. Although the auxiliary cleaning steps are effective for a certain purpose, for example, ozone water is effective for removal of organic matter, and sulfuric acid/hydrogen peroxide water and conc. sulfuric acid are effective for removal of metal particles, they are not suited for cleaning of abrasive grains, specifically colloidal silica, in the slurry which are believed to be the primary cause to raised defects. These chemical liquids have a possibility that fixation of raised defects is rather promoted due to a lowering of zeta potential during immersion therein.

Preferably the cleaning step of immersing the glass substrate in an acidic or basic solution to etch the glass substrate surface to a depth of 0.001 to 1 nm may be promoted by ultrasonication. Application of ultrasonic waves facilitates removal of raised defects. Ultrasonics preferably have a frequency in the range of 500 kHz to 3 MHz. A lower frequency corresponds to a larger amount of energy which can cause damages to the glass substrate surface. A higher frequency corresponds to a smaller amount of energy which may be insufficient to effectively remove raised defects of submicron size. The power of ultrasonication is preferably 25 to 100 watts. Outside the range, a lower power provides a short cleaning effect whereas a higher power is meaningless because the effect is saturated and an extra load is placed on the ultrasonic oscillator to shorten its lifetime.

The etching depth provided by the cleaning liquid is in a range of extremely small values. An etching depth is determined by first preparing a quartz glass plate having a determinable surface area and a weight of about 330 g. An accurate weight of the glass plate is measured. A cleaning solution is prepared in a volume of 20 L. The quartz glass plate is immersed in the cleaning solution, and kept immersed for a period of several hours to several weeks while the solution is frequently replaced by a fresh solution so that the immersing solution may be free of degradation. At certain time intervals, the weight of the glass plate is measured again. From a weight loss, an amount of surface material etched away with the cleaning solution is determined. An etching depth is computed from the etching amount.

The method of the invention may be applied to a synthetic quartz glass substrate which has been prepared from a synthetic quartz glass ingot by shaping, annealing, slicing, lapping, and rough polishing. That is, the method is applicable as precision polishing and subsequent cleaning steps by which the final surface quality is decided.

The synthetic quartz glass substrate resulting from the inventive method may be used in the fields of semiconductor-related electronic materials, and especially in photomask and nano-imprint applications.

For example, semiconductor-related substrates are dimensioned 152 mm by 152 mm by about 6.35 mm thick. In the case of nano-imprint substrates, since the nano-imprint technology is adapted to manufacture a small number of many different products, substrates of various sizes may be contemplated, including those of 152 mm by 152 mm by about 6.35 mm thick like the semiconductor substrates, those of 65 mm by 65 mm by about 6.35 mm thick, and wafer substrates having a diameter of 150 mm and a thickness of 0.5 to 1.0 mm.

EXAMPLE

Examples and Comparative Examples are given below for illustrating the invention, but the invention is not limited thereto. In Examples, the particle size is as measured by the dynamic light scattering method.

Example 1

A silica synthetic quartz glass substrate stock as sliced (6 inches) was lapped and roughly polished by a double-side polisher, after which it was subjected to final precision polishing. A soft suede-type polishing pad was used. A polishing slurry was used comprising a colloidal silica water dispersion having a $SiO_2$ concentration of 40% by weight (Fujimi Inc., primary particle size 78 nm) to which 0.5% by weight of sodium polyacrylate (weight average molecular weight 250,000-700,000, Wako Pure Chemical Industries Ltd.) was added and diethanolamine was added to adjust to pH 10. Polishing was done under a load of 10 gf while the polishing allowance was an amount sufficient to remove the flaws introduced in the rough-polishing step (at least about 1 μm).

After the polishing, the substrate was kept in pure water for about 3 hours. It was then immersed in a 0.2 wt % KOH aqueous solution at pH 12.6 to commence cleaning and kept immersed for 3 minutes until a surface etching depth of about 0.01 nm was reached. The cleaning was assisted by ultrasonication at a frequency of 1 MHz and a power of 50 W. This cleaning step was followed by an auxiliary cleaning step(s), such as by immersing in hydrogenated water under ultrasonication. The surface etching depth of the auxiliary cleaning step(s) was less than about 0.001 nm.

The cleaning step was followed by drying, after which defect inspection was carried out using a laser conforcal optical system high-sensitivity defect inspector (Lasertec Corp.). The number of defects was 2.3 on the average, specifically 1.7 raised defects, 0.6 recessed defects, and 0 streaks. Using an atomic force microscope (AFM), a surface roughness was measured to be 0.102 nm in RMS.

Comparative Example 1

The procedure of Example 1 was repeated except that the final precision polishing was carried out in a polishing slurry free of sodium polyacrylate. Upon defect inspection by a high-sensitivity defect inspector, the number of defects was 34 on the average, specifically 33.0 raised defects, 0.8 recessed defects, and 0.2 streaks. A RMS surface roughness was 0.105 nm.

Comparative Example 2

The procedure of Example 1 was repeated except that cleaning was carried out by immersing in an ammonia-containing hydrogenated water at pH 10.1 for 3 minutes to provide a surface etching depth of less than about 0.001 nm. Upon defect inspection by a high-sensitivity defect inspector, the number of defects was 1421 on the average, specifically 1420 raised defects and 1 recessed defects plus streaks. Notably, since numerous defects were present, a proportion of raised and recessed defects was computed from a profile observation of a surface portion under AFM. A RMS surface roughness was 0.098 nm.

Comparative Example 3

The procedure of Example 1 was repeated except that cleaning was carried out by immersing in a 0.5 wt % hydrofluoric acid solution for 3 minutes until a surface etching depth of about 3 nm was reached. Upon defect inspection by a high-sensitivity defect inspector, the number of defects was 5.1 on the average, specifically 1.3 raised defects, 3.6 recessed defects and 0.2 streaks. A RMS surface roughness was 0.128 nm. The number of defects was relatively small while recessed defects accounted for a larger proportion. A tendency for surface roughness to worsen was noticed.

Example 2

The procedure of Example 1 was repeated except that sodium polymaleate (weight average molecular weight 1,000, Toa Gosei Co., Ltd.) was used instead of sodium polyacrylate. Upon defect inspection as in Example 1, the number of defects was 3.5 on the average, specifically 1.0 raised defects, 2.5 recessed defects, and 0 streaks. A RMS surface roughness was 0.107 nm.

Example 3

The procedure of Example 1 was repeated except that an acrylic acid-maleic acid copolymer (weight average molecular weight 60,000, Nippon Shokubai Co., Ltd.) was used instead of sodium polyacrylate. Upon defect inspection as in Example 1, the number of defects was 4.6 on the average, specifically 3.1 raised defects, 1.2 recessed defects, and 0.3 streaks. A RMS surface roughness was 0.102 nm.

Example 4

The procedure of Example 1 was repeated except that aspartic acid (Wako Pure Chemical Industries Ltd.) was used instead of sodium polyacrylate. Upon defect inspection as in Example 1, the number of defects was 4.8 on the average, specifically 3.2 raised defects, 1.3 recessed defects, and 0.3 streaks. A RMS surface roughness was 0.108 nm.

Example 5

The procedure of Example 1 was repeated except that catechol (Wako Pure Chemical Industries Ltd.) was used instead of sodium polyacrylate. Upon defect inspection as in Example 1, the number of defects was 5.8 on the average, specifically 3.8 raised defects, 1.8 recessed defects, and 0.2 streaks. A RMS surface roughness was 0.099 nm.

Example 6

The procedure of Example 1 was repeated except that sodium hyaluronate (Wako Pure Chemical Industries Ltd.) was used instead of sodium polyacrylate. Upon defect inspection as in Example 1, the number of defects was 4.8 on the average, specifically 3.3 raised defects, 1.2 recessed defects, and 0.3 streaks. A RMS surface roughness was 0.104 nm.

Example 7

The procedure of Example 1 was repeated except that cleaning was carried out using a 0.2 wt % NaOH aqueous solution at pH 12.7 instead of the 0.2 wt % KOH aqueous solution until a surface etching depth of about 0.009 nm was reached. Upon defect inspection as in Example 1, the number of defects was 4.7 on the average, specifically 4.0 raised defects, 0.7 recessed defects, and 0 streaks. A RMS surface roughness was 0.107 nm.

Example 8

The procedure of Example 1 was repeated except that a solution at pH 12.6 which was prepared by adding 0.2 wt % of KOH to a 1 wt % aqueous solution of a commercially available weakly basic surfactant (Cleanthrough PC-3053, Kao Corp.) so as to increase an etching power was used instead of the 0.2 wt % KOH aqueous solution, and cleaning was carried out until a surface etching depth of about 0.021 nm was reached. Upon defect inspection as in Example 1, the number of defects was 2.8 on the average, specifically 1.9 raised defects, 0.8 recessed defects, and 0.1 streaks. A RMS surface roughness was 0.108 nm.

Comparative Example 4

The procedure of Example 1 was repeated except that a 1 wt % aqueous solution of a commercially available weakly basic surfactant (Cleanthrough PC-3053, Kao Corp.) at pH 9.3 was used instead of the 0.2 wt % KOH aqueous solution, and the surface etching depth was less than about 0.001 nm. Upon defect inspection as in Example 1, the number of defects was 82.8 on the average, specifically 81.4 raised defects, 1.3 recessed defects, and 0.1 streaks. A RMS surface roughness was 0.098 nm.

Example 9

The procedure of Example 1 was repeated except that cleaning was carried out after about 36 hours from the polishing step. Upon defect inspection as in Example 1, the number of defects was 11.8 on the average, specifically 10.2 raised defects, 1.5 recessed defects, and 0.1 streaks. A RMS surface roughness was 0.109 nm.

Example 10

After polishing as in Example 1, cleaning was carried out as follows. The glass substrate was immersed in a 0.2 wt % KOH aqueous solution at pH 12.6 to commence cleaning and kept immersed for 3 minutes until a surface etching depth of about 0.01 nm was reached. The cleaning was assisted by ultrasonication at a frequency of 1 MHz and a power of 50 W. Subsequent to this cleaning step, additional cleaning steps were continued, by immersing in hydrogenated water under ultrasonication, and further immersing in a solution at pH 12.6 which was prepared by adding 0.2 wt % of KOH to a 1 wt % aqueous solution of a commercially available weakly basic surfactant (Cleanthrough PC-3053, Kao Corp.) so as to increase an etching power, for 3 minutes until an etching depth of 0.021 nm was reached. The surface etching depth of the cleaning steps totaled to 0.031 nm. Upon defect inspection as in Example 1, the number of defects was 2.5 on the average, specifically 1.2 raised defects, 1.3 recessed defects, and 0 streaks. A RMS surface roughness was 0.101 nm.

Japanese Patent Application No. 2009-297214 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A method for preparing a synthetic quartz glass substrate, comprising the steps of:
   (1) polishing a synthetic quartz glass substrate with a polishing slurry comprising colloidal particles, an ionic organic compound having an electric charge of the same type as the colloidal particles, and water, and
   (2) immersing the polished substrate in an acidic or basic solution for etching the substrate surface to a depth of 0.001 to 1 nm.

2. The method of claim 1 wherein the polishing slurry is a dispersion comprising colloidal silica in a concentration of 20 to 50% by weight.

3. The method of claim 1 wherein the ionic organic compound is a water-soluble polymer.

4. The method of claim 3 wherein the water-soluble polymer is polyacrylic acid, polymaleic acid, or polyphthalic acid.

5. The method of claim 1 wherein the acidic or basic solution is an aqueous solution comprising an inorganic base of an alkali or alkaline earth metal.

6. The method of claim 1 wherein the immersing step (2) is performed within 48 hours from the end of the polishing step (1).

7. The method of claim 1, further comprising the step of cleaning the substrate resulting from the immersing step (2).

8. The method of claim 1 wherein the immersing step (2) includes ultrasonication.

\* \* \* \* \*